US012652456B1

(12) United States Patent　　　　(10) Patent No.: US 12,652,456 B1
Ekmecic et al.　　　　　　　　　　　(45) Date of Patent: Jun. 9, 2026

(54) CAMERA SWITCHING FOR ROI-BASED AUTOEXPOSURE

(71) Applicants: Emil Ekmecic, Santa Monica, CA (US); Anton Kondratenko, Port Saint Lucie, FL (US)

(72) Inventors: Emil Ekmecic, Santa Monica, CA (US); Anton Kondratenko, Port Saint Lucie, FL (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/782,596

(22) Filed: Jul. 24, 2024

Related U.S. Application Data

(60) Provisional application No. 63/515,275, filed on Jul. 24, 2023.

(51) Int. Cl.
　　*H04N 23/90*　　　(2023.01)
　　*H04N 23/611*　　(2023.01)
　　*H04N 23/73*　　　(2023.01)
(52) U.S. Cl.
　　CPC ........... *H04N 23/611* (2023.01); *H04N 23/73* (2023.01); *H04N 23/90* (2023.01)
(58) Field of Classification Search
　　None
　　See application file for complete search history.

(56) References Cited

U.S. PATENT DOCUMENTS

| | | | |
|---|---|---|---|
| 9,741,117 B2 | 8/2017 | Richards et al. | |
| 10,979,648 B2 | 4/2021 | Adler et al. | |
| 2015/0341620 A1 | 11/2015 | Han et al. | |
| 2017/0272644 A1* | 9/2017 | Chou | H04N 7/181 |
| 2021/0337223 A1* | 10/2021 | Mayrand | H04N 21/2393 |
| 2023/0015621 A1* | 1/2023 | Feng | H04N 23/71 |
| 2023/0176658 A1 | 6/2023 | Lee et al. | |
| 2024/0020596 A1* | 1/2024 | Naitou | G06V 20/52 |

FOREIGN PATENT DOCUMENTS

WO　　WO-2021216561 A2　　10/2021

OTHER PUBLICATIONS

"Capture Request—CONTROL_AE_REGIONS", Android Developers, [Online]. Retrieved from the Internet: <URL: https://web.archive.org/web/20230824160341/https://developer.android.com/reference/andro id/hardware/camera2/CaptureRequest#CONTROL_AE_REGIONS>, (archived Aug. 24, 2023), 5 pgs.

* cited by examiner

*Primary Examiner* — Eileen M Adams
(74) *Attorney, Agent, or Firm* — Schwergman Lundberg & Woessner, P.A.

(57)　　　　　　　　ABSTRACT

A system is disclosed, including a processor and a memory. The memory stores instructions that, when executed by the processor, configure the system to perform operations. Autoexposure (AE) primary camera information is obtained, identifying a first camera as an AE primary camera to be used for computing AE settings of the first camera and a second camera. First camera region of interest (ROI) information and second camera ROI information are obtained, representative of a first number of ROIs within a field of view (FOV) of the first camera and a second number of ROIs within a FOV of the second camera. In response to determining that the first number is zero and the second number is greater than zero, the AE primary camera information is updated to identify the second camera as the AE primary camera, and the second camera ROI information is processed to generate the AE settings.

19 Claims, 7 Drawing Sheets

CAMERA SWITCHING FOR ROI-BASED AUTOEXPOSURE

CROSS-REFERENCE TO RELATED APPLICATION

This patent application claims the benefit of U.S. Provisional Patent Application No. 63/515,275, filed Jul. 24, 2023, entitled "CAMERA SWITCHING FOR ROI-BASED AUTOEXPOSURE", which is incorporated by reference herein in its entirety.

TECHNICAL FIELD

The present disclosure relates generally to camera autoexposure and more particularly to switching an autoexposure primary camera in a multi-camera system based on regions of interest.

BACKGROUND

Autoexposure ("AE", also referred to as "auto exposure" or "auto-exposure") refers to a function or mode of a camera system in which the camera system automatically calculates and adjusts exposure settings based on light entering the camera aperture. Autoexposure features of a camera system may attempt to avoid under- or over-exposure of subjects visible within the camera's field of view.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
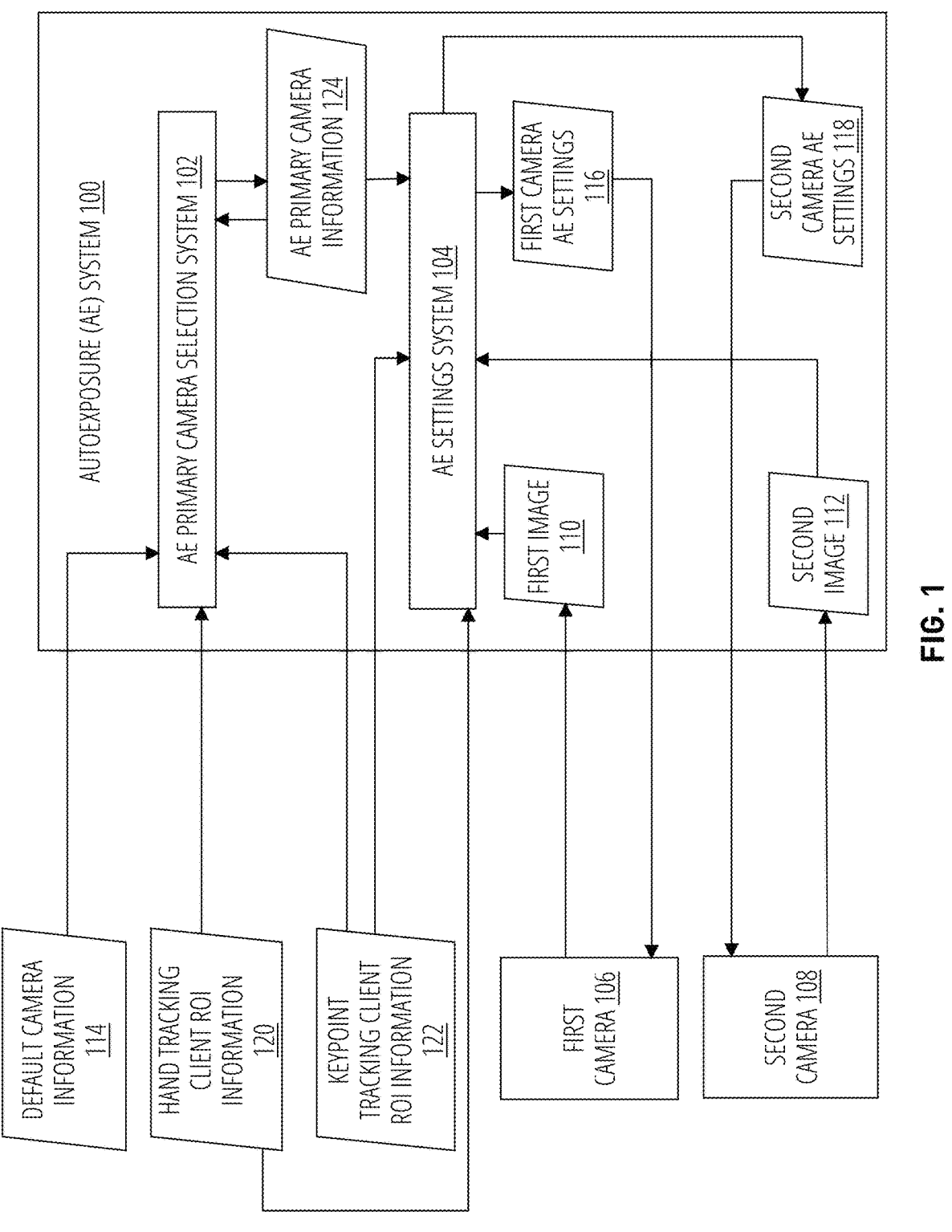
FIG. 1 is a block diagram of an AE system configured to perform AE for a multi-camera system, according to some examples.

Multi-camera systems include more than one camera. Some multi-camera systems may process visual data captured by multiple cameras by comparing or combining the visual data from the multiple cameras. In such systems, it may be beneficial to coordinate camera settings, such as exposure settings, across the multiple cameras. For example, a multi-camera system in which two or more cameras are used to view a common subject (such as a stereoscopic camera system) may benefit from both cameras using the same exposure settings, allowing the cameras' outputs to be compared and combined, without further luminance equalization, to identify features of the common subject, such as its three-dimensional shape, its distance from the device, and so on. In some multi-camera systems, such as panoramic camera systems, the outputs of multiple cameras may be stitched together or otherwise combined together to form a larger two- or three-dimensional mosaic image or scene; if the cameras do not use the same exposure settings, their outputs may be incongruous when combined.

Computing shared exposure settings for multiple cameras presents certain technical problems. A conventional approach to AE for a single camera is to measure the luma, luminance, or other measure of brightness across an entire image captured by the camera, and compute the AE setting for the camera based on the brightness measurements. However, for a multi-camera system, it may be necessary to select a single camera to be used for measuring the brightness of a captured image for the purpose of generating the AE settings. In multi-camera systems supporting multiple different tasks or processes, such as multiple different software clients and/or hardware components or processes (collectively referred to herein as "clients"), the choice of which camera to use for computing AE settings, and the computation of those settings based on an image captured by the selected camera, is not straightforward. For example, if a first client is configured to gather visual information regarding a first object in an environment, and a second client is configured to gather visual information regarding a second object in the environment, a sub-optimal choice of camera selection and/or sub-optimal computation of AE settings may result in the first object and/or second object being either under- or over-exposed in one or more of the images captured by the various cameras of the multi-camera system. In a worst-case scenario, all of the objects of interest (e.g., the first object and second object) may be either underexposed or overexposed in each of the images captured by the cameras (e.g., a first camera and a second camera of a two-camera device). Thus, it may be beneficial to provide techniques to improve the chance that a given object of interest (or other region of interest in an image) is well exposed (i.e., neither overexposed nor underexposed) in at least one of the images captured by the cameras.

Examples described herein provide an AE system and method that tracks regions of interest (ROIs) in the images captured by each camera of a multi-camera system, selects a camera to be used for computing AE settings (referred to herein as the "AE primary camera") based on the presence of ROIs within the camera's field of view (FOV), and computes AE settings for all of the cameras of the multi-camera system based on an image captured by the selected camera and the ROIs present within the captured image. Some examples may thereby attempt to address one or more technical problems presented by AE for multi-camera systems. In some examples, selecting an AE primary camera with one or more ROIs present within its FOV improves the chance that regions of interest to one or more clients are well exposed. In some examples, a relatively simple scheme is used for camera selection that does not require the AE system to sample or measure the contents of images captured by multiple cameras. In some examples, a computationally simple brightness measurement technique is applied to ROIs of an image captured by the selected camera, potentially reducing the computational load generated by the AE system (which may operate at a high frame rate and/or with a limited computational budget). In some examples, the AE system is agnostic as to the nature and/or importance of ROIs identified by various clients; by providing a layer of abstraction between the clients (which generate the ROIs) and the AE system, the multi-camera system may provide a flexible, modular design that allows individual clients to be designed that define their ROIs according to the specific needs of that client. Furthermore, in some stereoscopic camera systems having two cameras, the cameras use identical hardware and preferably operate using identical parameters; thus, it may be desirable to generate exposure settings shared by both cameras to ensure that they do not diverge in their operating parameters.

FIG. 1 shows a block diagram of an AE system 100 configured to perform AE for cameras of a multi-camera system. A skilled artisan will readily recognize that various additional functional components may be supported by the AE system 100 to facilitate additional functionality that is not specifically described herein. The various functional components depicted in FIG. 1 may reside on a single computing device or may be distributed across several computing devices in various arrangements such as those used in cloud-based architectures.

In some examples, the multi-camera system may be a mobile device, such as a smartphone or tablet, equipped with multiple cameras. In some examples, the multi-camera system may be a wearable device, such as a head-mounted display (HMD) or XR (extended reality) display equipped with multiple cameras. In some examples, the multi-camera system may be an autonomous driving system of a vehicle equipped with multiple cameras to model and understand the vehicle's environment. Other multi-camera systems to which the examples described herein may be applied include panoramic camera systems, stereoscopic camera systems, camera arrays, and other multi-camera systems with at least two cameras whose outputs are combined, compared, or otherwise used together. An example machine 600 is described below with reference to FIG. 6 which may provide an architecture for the multi-camera system in some examples. In some examples, the multi-camera system may use a software architecture as described with reference to FIG. 7 below.

Examples herein are described primarily with reference to a two-camera system. However, it will be appreciated that the techniques described herein are applicable to systems having more than two cameras having shared AE settings. Unless otherwise stated, all descriptions of a first camera and second camera of the multi-camera system can be considered to apply equally to third and/or further cameras thereof.

The AE system 100 is configured to obtain various types of information in order to perform AE. The multi-camera system may include one or more clients, as described above, each of which may generate client ROI information identifying one or more client ROIs of interest to the client. In some examples, the client ROI information may also include information characterizing the client ROIs, such as ROI location information identifying a location of the ROI within a camera's FOV or within an image captured by a camera, and/or ROI weight information characterizing weights to be applied to the ROI or various locations within the ROI.

In FIG. 1, client ROI information from two example clients is shown: hand tracking client ROI information 120 generated by a hand tracking client, and keypoint tracking client ROI information 122 generated by a keypoint tracking client. The hand tracking client may be a software client executed by the multi-camera system with the purpose of tracking a user's hand within the FOVs of the cameras of the multi-camera system. The hand tracking client ROI information 120 may therefore include one or more ROIs configured to track and properly expose a hand within a camera image, such as a bounding box around the region occupied by the hand within the image. In some examples, the hand tracking client may be configured to track more than one hand.

The keypoint tracking client may be a software client configured to track one or more keypoints within images captured by the cameras of the multi-camera system. The keypoints may include, in some examples, features within the environment used by a computer vision system of the multi-camera system to perform operations such as simultaneous localization and mapping (SLAM) and/or visual inertial odometry (VIO). The keypoint tracking client ROI information 122 may therefore include one or more ROIs configured to track and properly expose one or more keypoints within a camera image, such as bounding boxes around the region occupied by the keypoint within the image.

The multi-camera system includes a first camera 106 and a second camera 108. The first camera 106 captures a first image 110, and the second camera 108 captures a second image 112. The first image 110 and/or second image 112 may be processed by various clients to generate the client ROI information (e.g., hand tracking client ROI information 120 and keypoint tracking client ROI information 122); however, any such image processing is not handled by the example AE system 100 shown in FIG. 1. Instead, the AE system 100 receives the client ROI information that results from such processing, and the AE system 100 also uses the first image 110 or second image 112 to compute AE settings after the AE primary camera has been selected.

The first camera 106 and second camera 108 may be any type of sensor capable of capturing image data. For example, the first camera 106 and second camera 108 may be cameras, such as color cameras, configured to capture images and/or video.

In some examples, the AE system 100 may process default camera information 114 during selection of the AE primary camera. The default camera information 114 identifies a camera of the multi-camera system to be used as the default AE primary camera under certain conditions. In some examples, the default camera information 114 identifies one of the cameras as a hardware sync camera, which is a camera used by other subsystems of the multi-camera system to calibrate, normalize, reconcile, or synchronize various hardware components of the multi-camera system, such as various parameters of the various cameras.

The AE system 100 may store information identifying the currently-selected AE primary camera as AE primary camera information 124. The stored AE primary camera information 124 from previous time steps may also be processed by the AE system 100 in the course of selecting an AE primary camera at a current time step.

After computing AE settings for the cameras of the multi-camera system, the computed AE settings may be stored and/or transmitted as first camera AE settings 116 and second camera AE settings 118. In some examples, the first camera AE settings 116 and second camera AE settings 118 may exhibit differences to account for different parameters of the two cameras 106 and 108. However, the first camera AE settings 116 and second camera AE settings 118 are both computed using data from a single image, such as image 110 or image 112.

Figure 3:
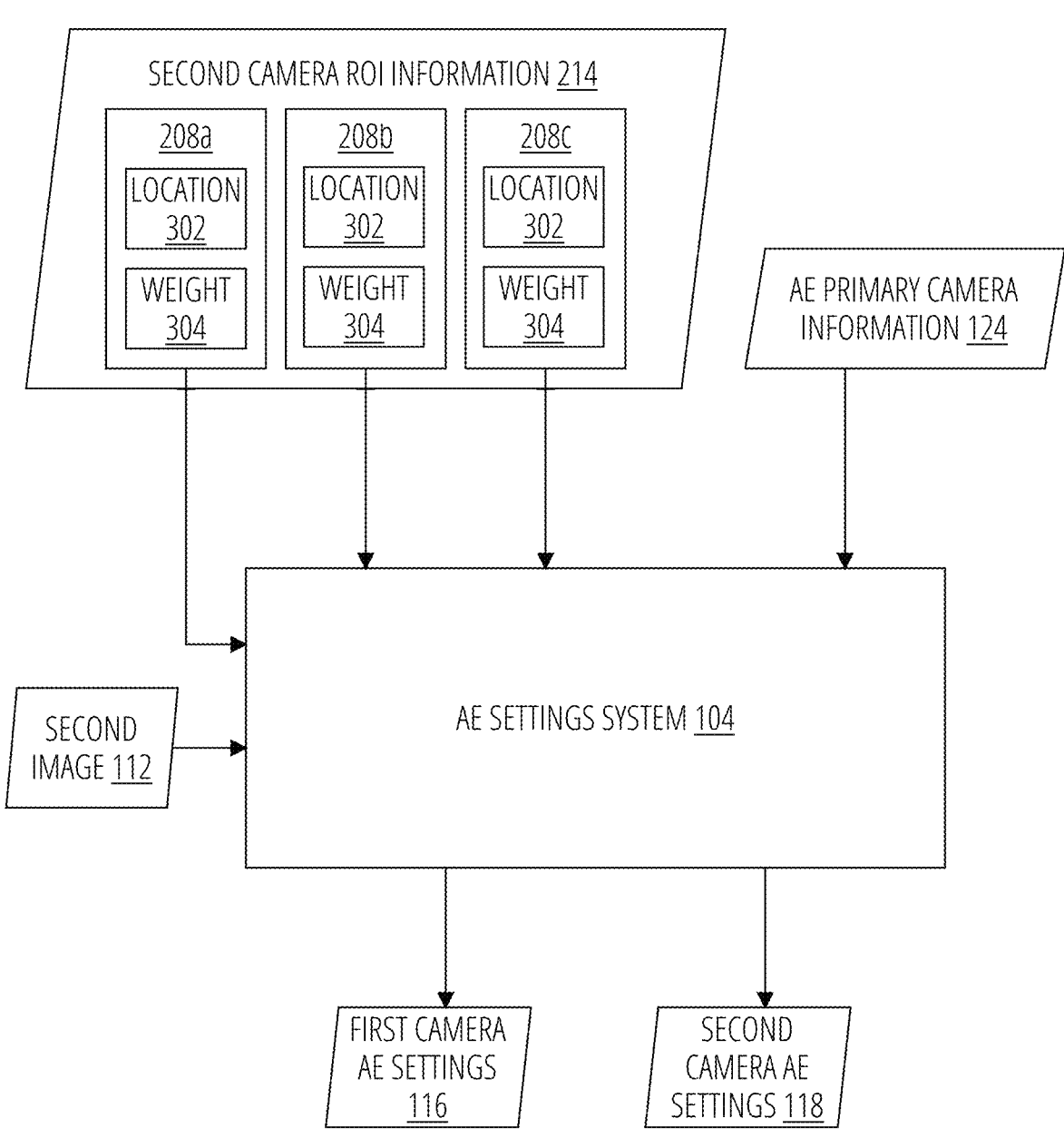
FIG. 3 is a block diagram of an example AE settings system of the AE system of FIG. 1.
Figure 4:
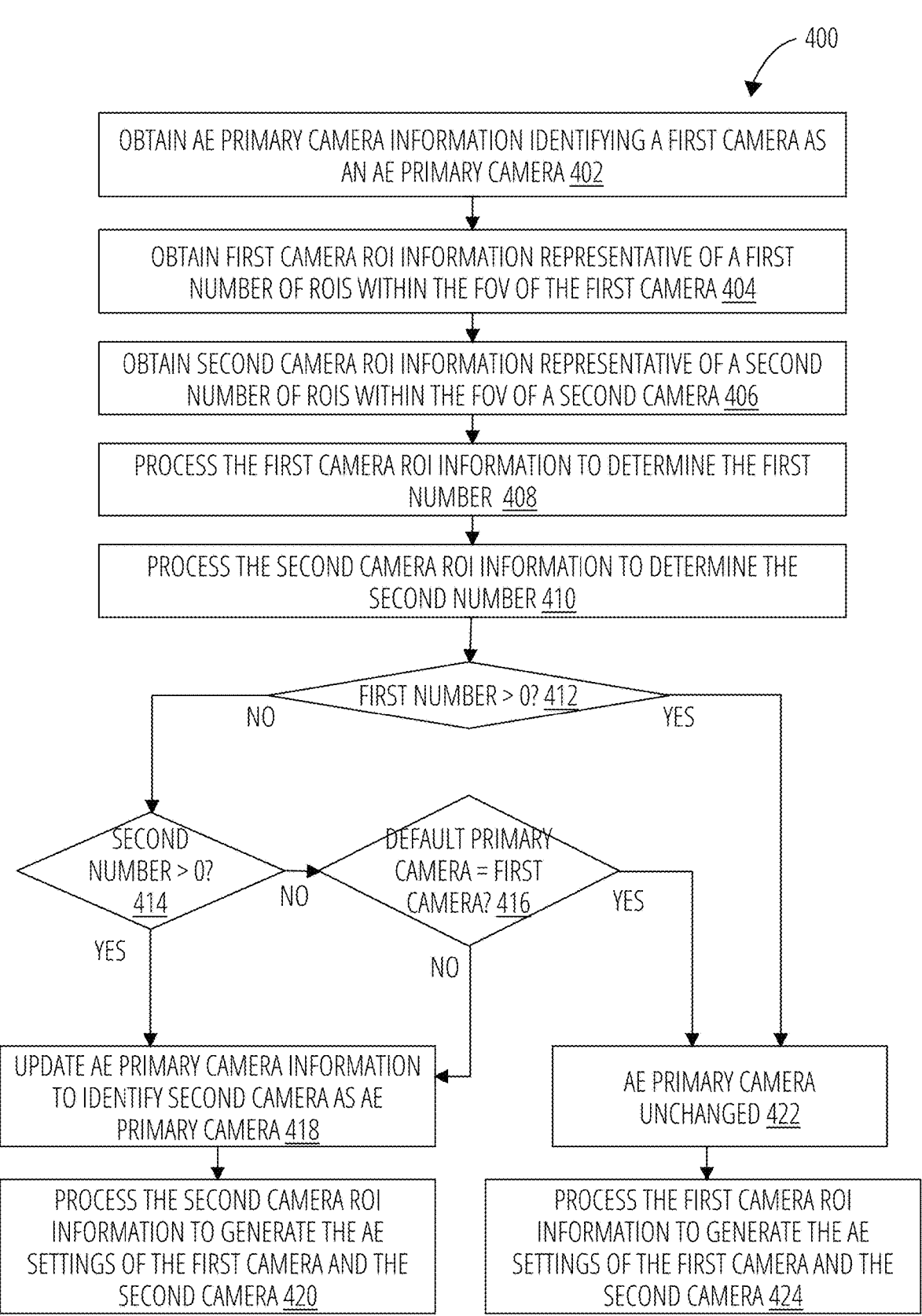
FIG. 4 is a flowchart showing operations of an example method for performing AE for a multi-camera system, according to some examples.

The illustrated AE system 100 includes two subsystems: an AE primary camera selection system 102 and an AE settings system 104. The operations of the example AE system 100 and the two subsystems are described below: details of the operation of the AE primary camera selection system 102 are shown in FIG. 2, details of the operation of AE settings system 104 are shown in FIG. 3, and an example method 400 performed by the AE system 100 as a whole is illustrated in the flowchart of FIG. 4.

Figure 2:
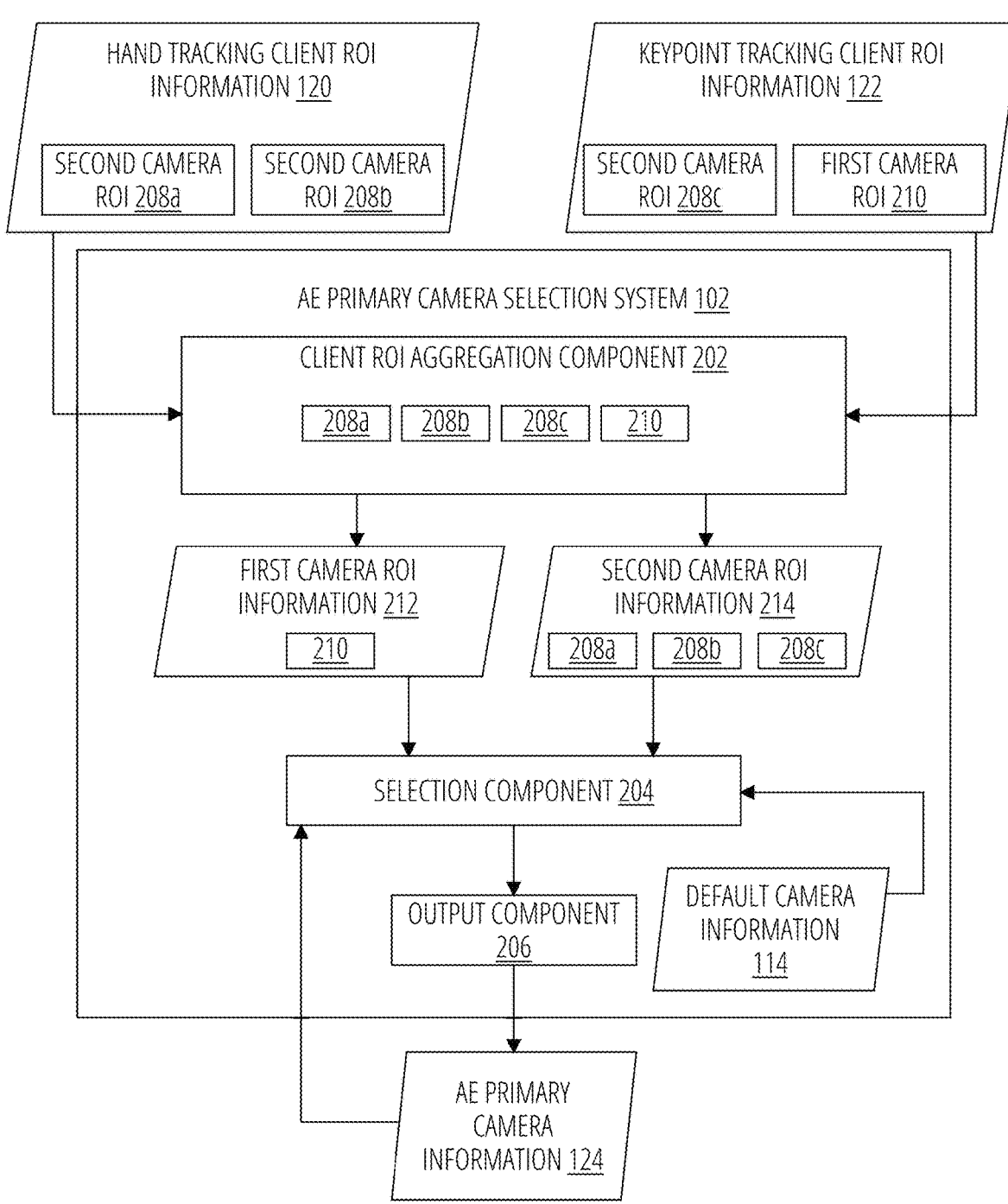
FIG. 2 is a block diagram of an example AE primary camera selection system of the AE system of FIG. 1.

FIG. 2 is a block diagram of an example AE primary camera selection system 102 of the AE system 100 shown in FIG. 1. The AE primary camera selection system 102 is configured to select an AE primary camera from the multiple cameras of the multi-camera system based on information received from the one or more clients of the multi-camera system.

The example AE primary camera selection system 102 shown in FIG. 2 includes three subsystems or components: a client ROI aggregation component 202, a selection component 204, and an output component 206. In some examples, some or all of the functions of one or more of these components may be implemented by one or more of the other components, or by another component or components of the AE system 100 or of the multi-camera system.

The client ROI aggregation component 202 is configured to receive client ROI information from the one or more clients of the multi-camera system, aggregate the client ROI information from multiple clients into a single collection of ROIs, and to separate the collection of ROIs into ROIs with the images captured by each of the cameras of the multi-camera system. In some examples, the client ROI aggregation component 202 generates the single collection of ROIs as a single array or vector of all client ROIs received from all clients. The client ROI aggregation component 202 then identifies the ROIs for each camera from the ROIs stored in the array or vector. Per-camera ROI information may thereby be generated, identifying and/or characterizing the ROIs that apply to the image captured by a given camera.

Thus, in the illustrated example, the client ROI aggregation component 202 processes the hand tracking client ROI information 120 and keypoint tracking client ROI information 122 to aggregate the client ROIs from each client into a single vector. The hand tracking client ROI information 120 includes two client ROIs (e.g., for tracking two hands observable by the second camera): a second camera ROI 208a identifying and/or characterizing a hand tracking client ROI present within the second image 112 captured by the second camera, and another second camera ROI 208b identifying and/or characterizing a hand tracking client ROI present within the second image 112. The keypoint tracking client ROI information 122 also includes two client ROIs: a further second camera ROI 208c identifying and/or characterizing a keypoint tracking client ROI present within the second image 112, and a first camera ROI 210 identifying and/or characterizing a keypoint tracking client ROI present within the first image 110. The single vector could thus be represented as a concatenation of ROIs 208a, 208b, 208c, and 210.

The client ROI aggregation component 202 then processes the vector to generate per-camera ROI information. The first camera ROI information 212 is generated to include the first camera ROI 210. The second camera ROI information 214 is generated to include the second camera ROI 208a, second camera ROI 208b, and second camera ROI 208c. In some examples, the per-camera ROI information includes the same information about each ROI as the client ROI information; in other examples, the information about each ROI in the per-camera ROI information may be a subset of the information about each ROI included in the client RO information.

The selection component 204 is configured to process the per-camera ROI information to select the AE primary camera. The selection of the AE primary camera based on the per-camera ROI information (e.g., first camera ROI information 212 and second camera ROI information 214) may be performed in accordance with an AE primary camera selection scheme, as described below with reference to the method 400 of FIG. 4, in some examples.

In some examples, the selection component 204 uses the default camera information 114 as an input to assist in selecting the AE primary camera, as described in greater detail below with reference to method 400.

After the selection component 204 selects the AE primary camera, the output component 206 generates AE primary camera information 124 to be stored and/or transmitted to the AE settings system 104. The stored AE primary camera information 124 is also used by the AE primary camera selection system 102 at future time steps.

FIG. 3 is a block diagram of an example AE settings system 104 of the AE system 100 of FIG. 1. The AE settings system 104 is configured to generate AE settings for the cameras of the multi-camera system based on an image captured by the AE primary camera, as selected by the AE primary camera selection system 102.

The AE settings system 104 receives the AE primary camera information 124 generated by the AE primary camera selection system 102 in order to identify which camera has been designated as the AE primary camera. The AE settings system 104 then obtains an image captured by the AE primary camera in order to compute AE settings for the cameras of the multi-camera system. In some examples, the computation of the AE settings is based on ROI information for the captured image, as represented in the client ROI information from the various clients (and as aggregated on a per-camera basis by the client ROI aggregation component 202).

In the illustrated example of FIG. 3, the AE primary camera has been designated in the AE primary camera information 124 as being the second camera 108. The AE settings system 104 processes the AE primary camera information 124 to identify the second camera 108 as the AE primary camera. In response, the AE settings system 104 obtains the second image 112 captured by the second camera 108, and also obtains the second camera ROI information 214 generated by the client ROI aggregation component 202. In this example, each client ROI (second camera ROI 208a, second camera ROI 208b, and second camera ROI 208c) is shown to include at least two types of information characterizing its ROI: ROI location information 302 and ROI weight information 304. The ROI location information 302 indicates a location of the ROI within the image (e.g., in this example, the location of the ROI within second image 112, such as coordinates of a bounding box within second image 112). The ROI weight information 304 indicates one or more weights to be applied to one or more pixel locations within the ROI (e.g., in this example, weights to be applied to various pixels of the second image 112 that fall within the bounding box indicated by the ROI location information 302).

In some examples, the ROI weight information 304 may be encoded or otherwise included in the client ROI information (and/or the per-camera ROI information, e.g., second camera ROI information 214) separately from the encoding of each ROI.

The ROI location information 302 and ROI weight information 304, and how they are applied to generate the AE settings, are described below with reference to FIG. 5. The AE settings system 104 processes the second camera ROI information 214 and second image 112 to compute AE settings for both cameras, which are stored and/or transmitted to other components of the multi-camera system (e.g., to drivers or controllers for first camera 106 and second camera 108) as first camera AE settings 116 a second camera AE settings 118.

FIG. 4 shows operations of an example method 400 for performing AE for a multi-camera system. The method 400 provides an example of how the AE system 100 can select an AE primary camera and use an image captured by that camera, along with ROI information received from various clients of the multi-camera system, to compute AE settings for the cameras of the multi-camera system.

Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence. Although the operations of the method 400 are described as being performed by the example AE system 100, it will be appreciated that one or more of the operations may be performed by another device or system, such as another component or multiple other components of the multi-camera system. Specifically, method 400 is described primarily with reference to the operations of the selection component 204 and AE settings system 104; the operations of an example client ROI aggregation component 202 are described above with reference to FIG. 2, and should be understood to be performed prior to the operations of method 400.

In some examples, method 400 is performed continuously during multi-camera operation of the multi-camera system. The method 400 is performed at each time step of a sequence of time steps, such as every time a new video frame is captured by the cameras. Thus, in some examples, the method 400 is iterated at the frame rate of the cameras of the multi-camera system, such as 30 frames per second (30 Hz) or 60 frames per second (60 Hz). In some examples, the AE system 100 does not perform the method 400 for each frame, but instead after every n frames, such as every 2 or 3 frames (e.g., at a rate of 15 Hz or 10 Hz for a 30 frames per second (fps) system). It will be appreciated that the duration and frequency of time steps for performing method 400 may follow different rules in different examples, and the duration or frequency of time steps may be adjustable or otherwise variable in some examples (e.g., the frequency with which method 400 is performed may vary in different operating modes and/or according to user-determined settings).

In some examples, method 400 implements an AE primary camera selection scheme in which an AE primary camera is selected based on the number of ROIs associated with each camera. If a current AE primary camera has at least one ROI associated with it, then it remains the AE primary camera. However, if the number of ROIs associated with the current AE primary camera is zero, and if at least one other camera has at least one ROI associated with it, then the camera with at least one ROI is designated as the new AE primary camera. In some examples with multi-camera systems having more than two cameras, if two or more of the other cameras each have ROIs associated with them, then various criteria can be used to choose the new AE primary camera. For example, the camera with the largest number of associated ROIs may be selected, and ties can be broken using a predetermined hierarchy or order of camera priority (such as an ordered priority list of default cameras, as described below). Finally, if no camera has any associated ROIs (e.g., each camera-specific ROI information instance for each camera is representative of zero ROIs), then another criterion is used to select the AE primary camera. In some examples, a default camera is designated by the default camera information 114, such as a hardware sync camera (as described above). The default camera may be selected as the AE primary camera if all cameras have zero associated ROIs. In some examples, the default camera information 114 may identify an order or hierarchy of default cameras, allowing ties to be broken based on the order or hierarchy of the cameras. In some examples, instead of using default camera information 114 in cases of all cameras having zero associated ROIs, the AE primary camera selection system 102 may instead leave the selection of the current AE primary camera unchanged.

The example method 400 will now be described with references to the operations and decisions shown in the flowchart of FIG. 4.

At operation 402, the selection component 204 obtains AE primary camera information 124 identifying a camera of the multi-camera system (e.g., first camera 106) as the AE primary camera to be used for computing AE settings of the cameras of the multi-camera system (e.g., first camera 106 and second camera 108). In this example, first camera 106 will be understood to refer to the camera that is identified as the AE primary camera. As described above, this method 400 is also applicable to sets of more than two cameras.

At operation 404, the selection component 204 obtains first camera ROI information 212 representative of a first number of ROIs within a FOV of the first camera 106. The first number is the number of ROIs identified by the first camera ROI information 212; in the illustrated example, the first camera ROI information 212 is representative of one ROI—first camera ROI 210—and the first number is therefore equal to one. In some examples, the first camera ROI information 212 is obtained from the client ROI aggregation component 202, as described above. In other examples, a separate component of the multi-camera system or the AE system 100 generates the per-camera ROI information (e.g., first camera ROI information 212 and second camera ROI information 214) for each camera.

At operation 406, the selection component 204 obtains second camera ROI information 214 representative of a second number of ROIs within a FOV of the second camera 108. The second number is the number of ROIs identified by the second camera ROI information 214; in the illustrated example, the second camera ROI information 214 is representative of three ROIs—second camera ROI 208a, second camera ROI 208b, and second camera ROI 208c—and the second number is therefore equal to three. In various examples, the second camera ROI information 214 can be obtained from the client ROI aggregation component 202 or another component, as described above at operation 404.

At operation 408, the selection component 204 processes the first camera ROI information 212 to determine the first number (e.g., the number one in the illustrated example).

At operation 410, selection component 204 processes the second camera ROI information 214 to determine the second number (e.g., the number three in the illustrated example).

At decision 412, the selection component 204 checks whether the first number is greater than zero. If the first number is greater than zero, the method 400 proceeds to operation 422; otherwise, method 400 proceeds to decision 414.

At operation 422, after determining that the first number is greater than zero, thereby indicating that the first camera (currently selected as the AE primary camera) has at least one ROI associated with it (e.g., represented in its first camera ROI information 212), the selection component 204 keeps the AE primary camera unchanged. The method 400 then proceeds to operation 424.

At operation 424, the AE settings system 104 processes the first camera ROI information 212 to generate the AE settings of the first camera 106 (e.g., first camera AE settings 116) and the AE settings of the second camera 108 (e.g., second camera AE settings 118). The operations of an example AE settings system 104 are described in greater detail below with reference to FIG. 5.

At decision 414, after it has been determined that the first camera ROI information 212 includes zero ROIs, and thus the current AE primary camera is associated with zero ROIs, the selection component 204 checks whether the second number is greater than zero. If the second number is greater than zero, the method 400 proceeds to operation 418; otherwise, method 400 proceeds to decision 416.

At operation 418, after determining that the second camera 108 is associated with at least one ROI (e.g., that second camera ROI information 214 includes at least one ROI), the selection component 204 (via output component 206) updates the AE primary camera information 124 to identify the second camera 108 as the AE primary camera. This operation may be referred to as a "switch" or "camera switch" in the context of camera switching for multi-camera AE. It will be appreciated that, during a further iteration of method 400 at a subsequent time step, the second camera 108 will be designated as the AE primary camera, and the second camera 108 will therefore be treated as the first camera 106 in the context of this example method 400, whereas the first camera 106 (no longer designated the AE primary camera) will be treated as the second camera 108.

The camera switching that occurs at operation 418 can be triggered by a number of factors in the multi-camera system and/or the environment being viewed by the cameras. Occlusion or disocclusion of an object being tracked by a camera can decrease or increase the camera's associated number of ROIs. Activation, deactivation, or a change in operation of a client can generate or remove ROIs generated by that client. Movement of an object in or out of the FOV of one or more of the cameras can result in more or fewer ROIs associated with one or more of the cameras. Changes in lighting conditions can result in the view of a tracked object being more favorable in one camera than another, or one or more of the cameras failing to track the object, resulting in a change in the number of ROIs. Other factors may also result in changes to the number of ROIs associated with each camera. However, the example AE system 100 described herein is agnostic to the reasons underlying the changes to the ROIs; the ROIs are generated by the clients, and the AE system 100 performs AE based on the ROI information supplied by the clients.

It will also be appreciated that, in example multi-camera systems having more than two cameras, further instances of operation 406, operation 410, and decision 414 may be included in an alternative version of method 400, as the third and subsequent cameras are checked with respect to their number of associated ROIs.

At decision 416, after both cameras have been determined to have zero associated ROIs (e.g., neither first camera ROI information 212 nor second camera ROI information 214 represents or includes any ROIs), another criterion is used to select the AE primary camera, as a tie-breaker. In the illustrated example, the other criterion is the use of default camera information 114 to identify a default primary camera, such as a hardware sync camera. The selection component 204 processes the default camera information 114 to identify the default primary camera. If the default primary camera is determined to be the first camera 106, the method 400 proceeds to operation 422; if the default primary camera is determined to be the second camera 108, the method 400 proceeds to operation 418.

After an AE primary camera has been determined at operation 418 or operation 422, the AE settings system 104 generates the AE settings. After operation 418, setting the second camera 108 as the AE primary camera, the method 400 proceeds to operation 420. At operation 420, the AE settings system 104 processes the second camera ROI information 214 to generate the AE settings of the first camera 106 (e.g., first camera AE settings 116) and the AE settings of the second camera 108 (e.g., second camera AE settings 118). The AE settings system 104 also processes the second image 112, captured by the second camera 108, to generate the first camera AE settings 116 and second camera AE settings 118.

After operation 422, leaving the first camera 106 designated as the AE primary camera, the method 400 proceeds to operation 424. At operation 424, the AE settings system 104 processes the first camera ROI information 212 to generate the AE settings of the first camera 106 (e.g., first camera AE settings 116) and the AE settings of the second camera 108 (e.g., second camera AE settings 118). The AE settings system 104 also processes the first image 110, captured by the first camera 106, to generate the first camera AE settings 116 and second camera AE settings 118.

Following the performance of method 400, the first camera AE settings 116 and second camera AE settings 118 are used by the multi-camera system to adjust the exposure of the first camera 106 and second camera 108, respectively. It will be appreciated that additional sets of camera-specific AE settings may be generated in example multi-camera systems having more than two cameras.

Details of the operations of an example AE settings system 104 in generating the first camera AE settings 116 and second camera AE settings 118 based on the input image (e.g., first image 110 or second image 112) and camera-specific ROI information for the AE primary camera are described in greater detail below with reference to FIG. 5.

Figure 5:
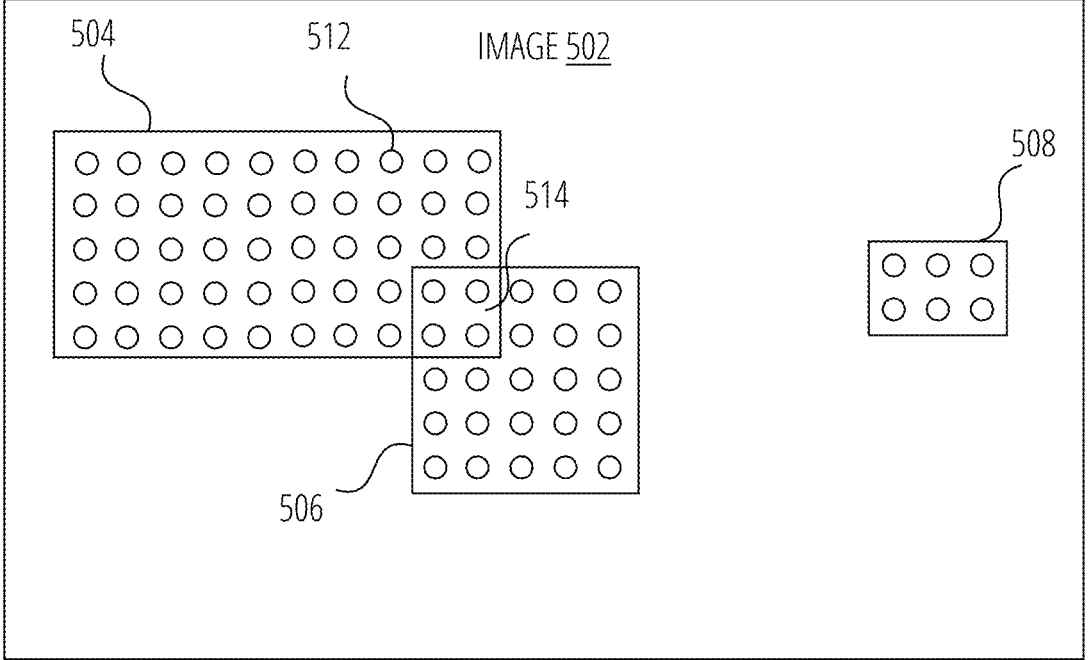
FIG. 5 illustrates an example image showing multiple ROIs being sampled for computing AE settings, according to some examples.

FIG. 5 shows an example image 502 provided as input to the AE settings system 104 for generating AE settings (e.g., first camera AE settings 116 and second camera AE settings 118). In the illustrated example, the brightness of the input image 502 captured by the AE primary camera is metered or otherwise measured within the ROIs associated with the AE primary camera (e.g., the first camera ROI information 212 or second camera ROI information 214), optionally weighted on a per-ROI and/or per-pixel (or per-sampling location) basis. A sum, weighted sum, average, or weighted average of brightness samples is then used as an overall brightness level for generating the AE settings.

In the illustrated example, the image 502 (e.g., second image 112) is associated with three ROIs: a first ROI 504

(e.g., second camera ROI 208a), a second ROI 506 (e.g., second camera ROI 208b), and a third ROI 508 (e.g., second camera ROI 208c). The locations (e.g., coordinates of each corner) of the ROIs 504, 506, and 508 within the image 502 may be determined by the ROI location information 302 of each ROI (e.g., 208a, 208b, and 208c) as encoded within the ROI information (e.g., second camera ROI information 214).

Locations within each ROI are sampled for brightness, such as a luma or luminance value, by the AE settings system 104. The sampled locations (shown as pixel locations 512 in FIG. 5) may correspond to pixel locations of the image 502, regions of the image 502, or some other specification for locations within the image 502, and may be referred to as "pixel locations" or "sample locations". In some examples, the ROIs are sampled over a region or multiple pixels, or at a sampling period of some number of pixels (m>1) in the horizontal and/or vertical dimensions (where the length of the period can differ in the two dimensions). It will be appreciated that various techniques can be used for brightness sampling of regions of an image.

In some examples, the sampling period is relatively high in order to simplify computation of the AE settings. For example, a 1280 by 1024 pixel image 502 may be sampled at pixel locations 512 separated at a period of 20 pixels in the horizontal dimension and 21.333 pixels in the vertical direction, resulting in 64 by 48=3072 potential pixel locations 512 to be sampled within the image 502.

In some examples, each ROI, and/or different locations within each ROI, may be associated with different weights, as represented by the ROI weight information 304 encoded within the ROI information. In some examples, the pixel locations 512 sampled within first ROI 504 may be weighted by a first weight value, and the pixel locations 512 sampled within second ROI 506 may be weighted by a second weight value, wherein the first weight value and second weight value are derived from the ROI weight information 304 of the ROI information (e.g., second camera ROI information 214) and/or one or more of the ROIs encoded therein (e.g., second camera ROI 208a and second camera ROI 208b, respectively).

In some examples, one or more of the ROIs may be associated with ROI weight information 304 indicating a varying weight to be applied to different pixel locations 512 within the ROI. Thus, for example, an ROI as encoded in the ROI information (e.g., second camera ROI 208a in second camera ROI information 214) may include ROI weight information 304 that assigns a higher weight value to pixel locations 512 at the center of the ROI (e.g., first ROI 504) than pixel locations 512 at the periphery of the ROI. It will be appreciated that other weighting schemes can be encoded in the ROI weight information 304 in different examples.

In an example computational operation of the AE settings system 104 on image 502, each sampled pixel location 512 within the first ROI 504, second ROI 506, or third ROI 508 is metered, and its measured brightness value is multiplied by or otherwise combined with its associated weight value as represented in the ROI weight information 304 for the ROI. These weighted sample values are then averaged or otherwise combined (e.g., as an arithmetic or geometric mean, a median, or some other averaging function) to generate an overall brightness value. The overall brightness value is used to generate the AE settings (e.g., first camera AE settings 116 and second camera AE settings 118) for the cameras.

In some examples, the sampled brightness values of each pixel location 512, weighted or unweighted, may be used to generate a brightness histogram, and the brightness histogram is used to generate the AE settings. In some such examples, the weight value (e.g., a weight value from 0.0 to 1.0) is used to weight the contribution of a given sample's brightness value to the effective number of samples counted at the measured brightness value within the histogram.

One consequence of this sampling and weighted averaging operation is that any region where two ROIs overlap, such as overlapping region 514, will be sampled twice and weighted according to the ROI weight information 304 of both ROIs (e.g., first ROI 504 and second ROI 506). Thus, in the example of weight values between 0.0 and 1.0, the pixel locations 512 in the overlapping region 514 may have an effective weight value of the weight value assigned by first ROI 504 plus the weight value assigned by second ROI 506 in generating the histogram or weighted average.

The AE settings generated by the AE settings system 104, such as first camera AE settings 116 and second camera AE settings 118, may include an exposure time, a gain value, and/or other exposure settings, for each camera.

In some examples, using a sampling and averaging (or weighted averaging) operation to generate the overall brightness value is computationally lightweight and simple, thereby potentially enabling low-overhead computation of AE settings at a high camera frame rate.

Machine Architecture

Figure 6:
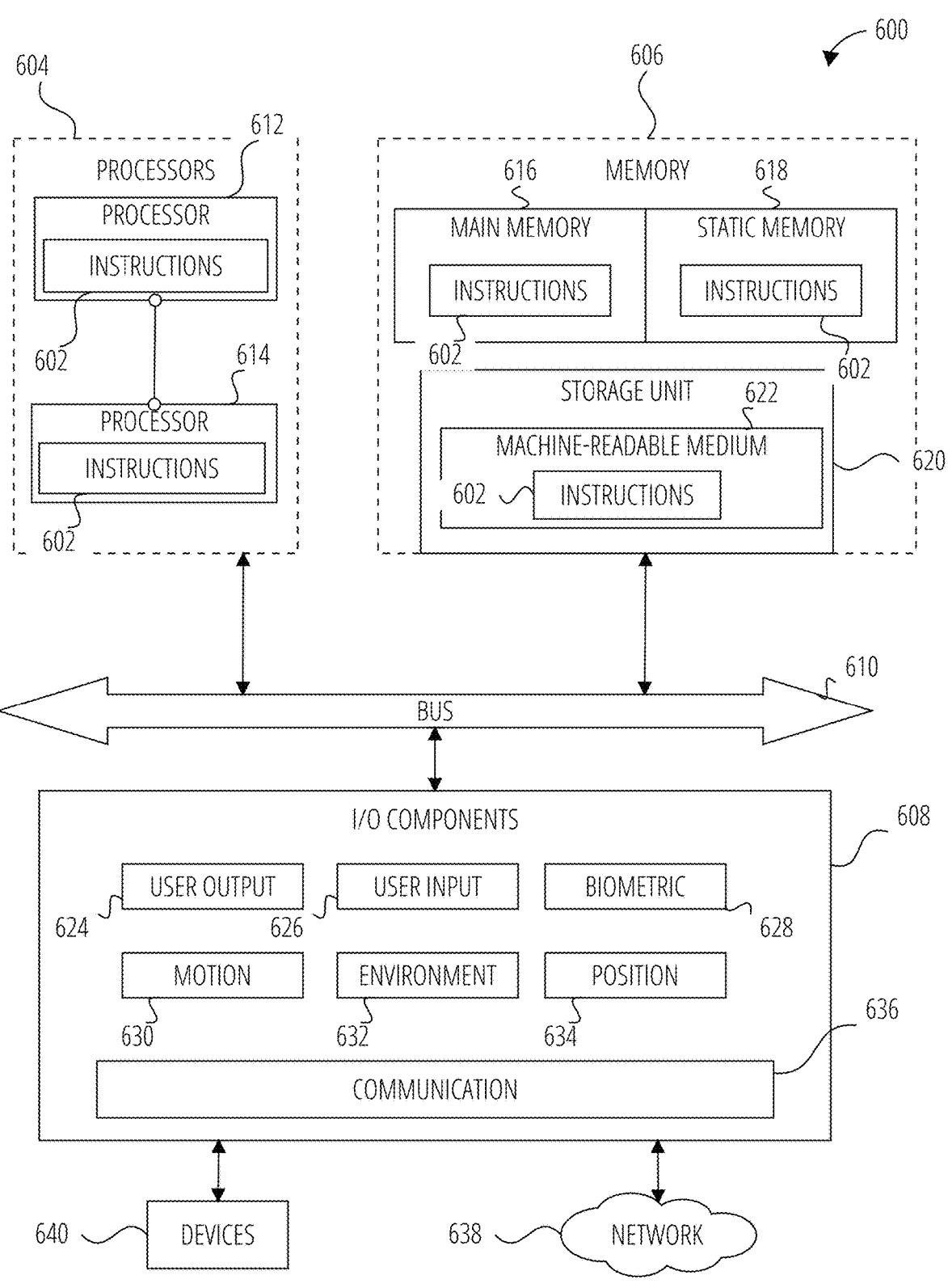
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. In some examples, the machine 600 may comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, and/or rotation sensor components (e.g., gyroscope).

The environmental components 632 include, for example, one or more cameras (with still image/photograph and video capabilities) such as first camera 106 and second camera 108, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 600 may have a camera system comprising, for example, front cameras on a front surface of the machine 600 and rear cameras on a rear surface of the machine 600. The front cameras may, for example, be used to capture still images and video of a user of the machine 600 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 600 may also include a 360° camera for capturing 360° photographs and videos.

Further, the camera system of the machine 600 may include dual rear cameras (e.g., a primary camera as well as a depth-sensing camera), or even triple, quad or penta rear camera configurations on the front and rear sides of the machine 600. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol [HTTP]). Similarly, the instructions 602 may be transmitted or received using a transmission medium via a coupling (e.g., a peer-to-peer coupling) to the devices 640.

Software Architecture

Figure 7:
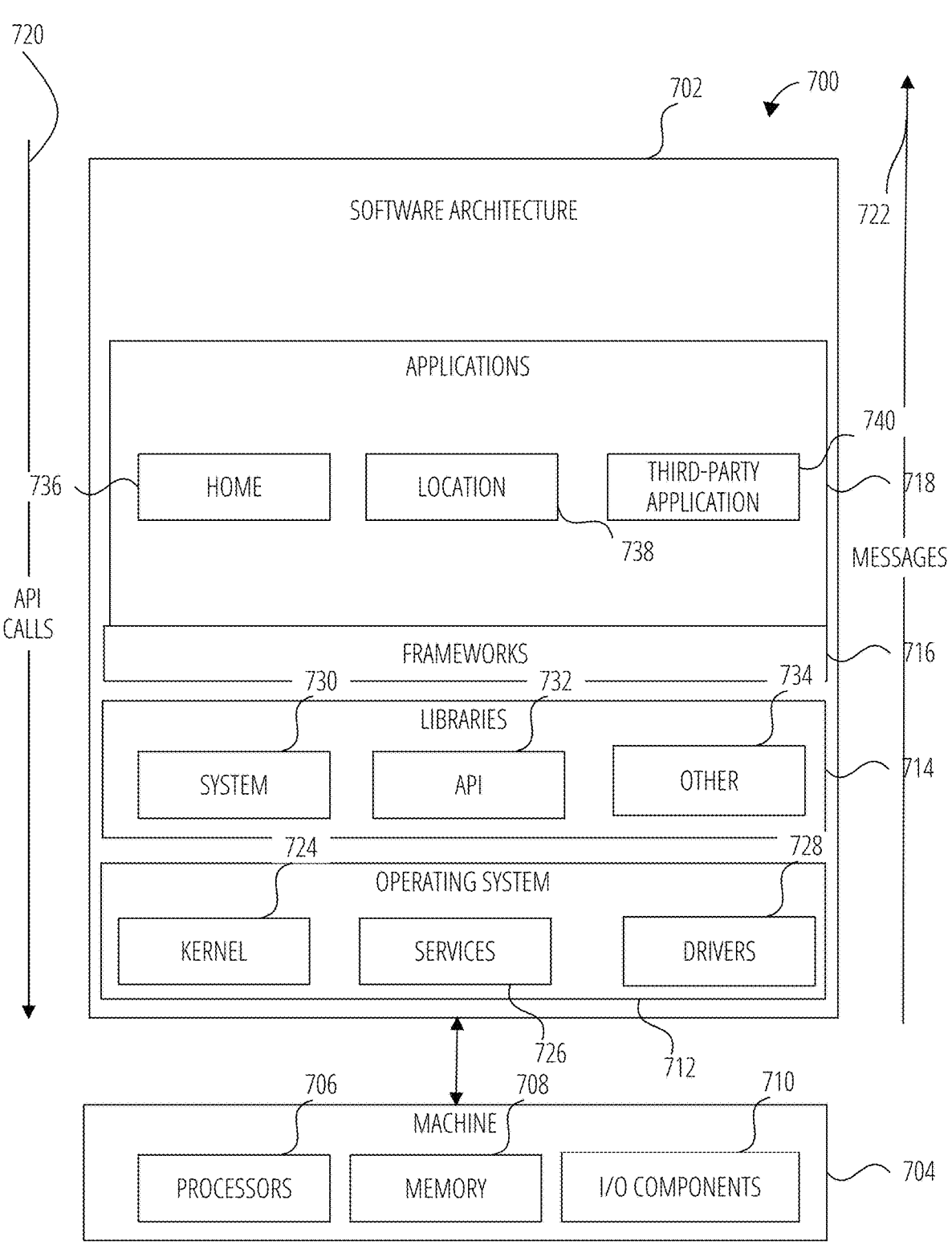
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720. The AE system 100 and AE primary camera selection system 102 thereof may be implemented by components in one or more layers of the software architecture 702.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a location application 738, and a broad assortment of other applications such as a third-party application 740. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 720 provided by the operating system 712 to facilitate functionalities described herein.

CONCLUSION

Examples described herein may provide an AE system 100 for selecting an AE primary camera and generating AE settings for multiple cameras of a multi-camera system, based on regions of interest associated with each camera as identified by one or more clients.

Example 1 is a system comprising: a processor; and a memory storing instructions that, when executed by the processor, configure the system to perform operations comprising: obtaining autoexposure (AE) primary camera information identifying a first camera as an AE primary camera to be used for computing AE settings of the first camera and a second camera; obtaining first camera region of interest (ROI) information representative of a first number of ROIs within a field of view (FOV) of the first camera; obtaining second camera ROI information representative of a second number of ROIs within a FOV of the second camera;

processing the first camera ROI information to determine the first number; processing the second camera ROI information to determine the second number; and in response to determining that the first number is zero and the second number is greater than zero: updating the AE primary camera information to identify the second camera as the AE primary camera; and processing the second camera ROI information to generate the AE settings of the first camera and the AE settings of the second camera.

In Example 2, the subject matter of Example 1 includes, wherein: the operations further comprise obtaining an image captured by the second camera; the second camera ROI information comprises, for each ROI of the second number of ROIs, ROI location information indicating a location of the ROI within the image; and processing the second camera ROI information to generate the AE settings comprises processing portions of the image at the locations of the ROIs indicated by the ROI location information.

In Example 3, the subject matter of Example 2 includes, wherein: the second camera ROI information further comprises ROI weight information indicating one or more weights to be applied to one or more pixel locations within one or more of the second number of ROIs; and processing portions of the image at the locations of the ROIs indicated by the ROI location information comprises: applying the ROI weight information to the portions of the image to generate the AE settings.

In Example 4, the subject matter of Examples 1-3 includes, wherein: the AE settings comprise an exposure time setting and a camera gain setting.

In Example 5, the subject matter of Examples 1-4 includes, wherein: the operations further comprise: obtaining default camera information identifying the first camera as a default primary camera; obtaining further first camera ROI information and further second camera ROI information; processing the first camera ROI information and second camera ROI information to determine an updated first number and an updated second number; and in response to determining that the updated first number is zero, the updated second number is zero, and the first camera is the default primary camera: updating the AE primary camera information to identify the first camera as the AE primary camera.

In Example 6, the subject matter of Example 5 includes, wherein: the default primary camera is a hardware sync camera used for calibrating hardware.

In Example 7, the subject matter of Examples 1-6 includes, wherein updating the AE primary camera information to identify the second camera as the AE primary camera in response to determining that the first number is zero and the second number is greater than zero comprises: selecting an AE primary camera according to an AE primary camera selection scheme in which: if the first number is zero and the second number is greater than zero, the second camera is selected as the AE primary camera; if the second number is zero and the first number is greater than zero, the first camera is selected as the AE primary camera; if the second number is greater than zero and the first number is greater than zero, the AE primary camera remains unchanged; and if the second number is zero and the first number is zero, a default primary camera is selected as the AE primary camera.

In Example 8, the subject matter of Example 7 includes, wherein the operations further comprise: obtaining default camera information identifying the first camera or the second camera as the default primary camera.

In Example 9, the subject matter of Examples 1-8 includes, wherein the operations further comprise: generating, by each client of one or more clients, client ROI information representative of one or more client ROIs, each client ROI being within the FOV of the first camera or the FOV of the second camera; and processing the client ROI information of the one or more clients to generate the first camera ROI information and the second camera ROI information.

In Example 10, the subject matter of Example 9 includes, wherein: the operations further comprise obtaining an image captured by the second camera; the one or more clients include a hand tracking client; the one or more client ROIs of the hand tracking client include at least one client ROI comprising hand location information representative of a location of a hand in the image; and processing the second camera ROI information to generate the AE settings comprises: processing portions of the image at the location of the hand to generate AE settings configured to avoid underexposure or overexposure of the hand in further images captured by the second camera.

In Example 11, the subject matter of Examples 9-10 includes, wherein: the operations further comprise obtaining an image captured by the second camera; the one or more clients include a keypoint tracking client; the one or more client ROIs of the keypoint tracking client include at least one client ROI comprising keypoint location information representative of a location of a keypoint in the image; and processing the second camera ROI information to generate the AE settings comprises: processing portions of the image at the location of the keypoint to generate AE settings configured to avoid underexposure or overexposure of the keypoint in further images captured by the second camera.

Example 12 is a method, performed by a processor, comprising: obtaining autoexposure (AE) primary camera information identifying a first camera as an AE primary camera to be used for computing AE settings of the first camera and a second camera; obtaining first camera region of interest (ROI) information representative of a first number of ROIs within a field of view (FOV) of the first camera; obtaining second camera ROI information representative of a second number of ROIs within a FOV of the second camera; processing the first camera ROI information to determine the first number; processing the second camera ROI information to determine the second number; and in response to determining that the first number is zero and the second number is greater than zero: updating the AE primary camera information to identify the second camera as the AE primary camera; and processing the second camera ROI information to generate the AE settings of the first camera and the AE settings of the second camera.

In Example 13, the subject matter of Example 12 includes: further comprising obtaining an image captured by the second camera; wherein: the second camera ROI information further comprises ROI weight information indicating one or more weights to be applied to one or more pixel locations within one or more of the second number of ROIs; and processing portions of the image at the locations of the ROIs indicated by the ROI location information comprises: applying the ROI weight information to the portions of the image to generate the AE settings.

In Example 14, the subject matter of Examples 12-13 includes, wherein: the AE settings comprise an exposure time setting and a camera gain setting.

In Example 15, the subject matter of Examples 12-14 includes, obtaining default camera information identifying the first camera as a default primary camera; obtaining further first camera ROI information and further second camera ROI information; processing the first camera ROI information and second camera ROI information to determine an updated first number and an updated second number; and in response to determining that the updated first number is zero, the updated second number is zero, and the first camera is the default primary camera: updating the AE primary camera information to identify the first camera as the AE primary camera.

In Example 16, the subject matter of Example 15 includes, wherein: the default primary camera is a hardware sync camera used for calibrating hardware.

In Example 17, the subject matter of Examples 12-16 includes, generating, by each client of one or more clients, client ROI information representative of one or more client ROIs, each client ROI being within the FOV of the first camera or the FOV of the second camera; and processing the client ROI information of the one or more clients to generate the first camera ROI information and the second camera ROI information.

In Example 18, the subject matter of Example 17 includes: further comprising obtaining an image captured by the second camera; the one or more clients include a hand tracking client; the one or more client ROIs of the hand tracking client include at least one client ROI comprising hand location information representative of a location of a hand in the image; and processing the second camera ROI information to generate the AE settings comprises: processing portions of the image at the location of the hand to generate AE settings configured to avoid underexposure or overexposure of the hand in further images captured by the second camera.

In Example 19, the subject matter of Examples 17-18 includes: further comprising obtaining an image captured by the second camera; the one or more clients include a keypoint tracking client; the one or more client ROIs of the keypoint tracking client include at least one client ROI comprising keypoint location information representative of a location of a keypoint in the image; and processing the second camera ROI information to generate the AE settings comprises: processing portions of the image at the location of the keypoint to generate AE settings configured to avoid underexposure or overexposure of the keypoint in further images captured by the second camera.

Example 20 is a non-transitory computer-readable storage medium, the computer-readable storage medium including instructions that when executed by a processor of a system, cause the system to: obtain autoexposure (AE) primary camera information identifying a first camera as an AE primary camera to be used for computing AE settings of the first camera and a second camera; obtain first camera region of interest (ROI) information representative of a first number of ROIs within a field of view (FOV) of the first camera; obtain second camera ROI information representative of a second number of ROIs within a FOV of the second camera; process the first camera ROI information to determine the first number; process the second camera ROI information to determine the second number; and in response to determining that the first number is zero and the second number is greater than zero: update the AE primary camera information to identify the second camera as the AE primary camera; and process the second camera ROI information to generate the AE settings of the first camera and the AE settings of the second camera.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Well exposed" or "properly exposed" refer to, for example, a state in which a subject or region within an image captured by a camera is neither overexposed nor underexposed. "Overexposed" and "underexposed" refer to a level of brightness or darkness, respectively, outside of the dynamic range of the camera.

An image "captured" by a camera refers to, for example, an image which is observed by the image sensor of the camera and made available for transmission or processing by other components, without necessarily storing the image to a memory or otherwise making or storing a copy of the image.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A device comprising:
a first camera;
a second camera;
a processor; and
a memory storing instructions that, when executed by the processor, configure the device to perform operations comprising:
obtaining autoexposure (AE) primary camera information identifying the first camera as an AE primary camera to be used for computing AE settings of the first camera and the second camera;
obtaining first camera region of interest (ROI) information representative of a first number of ROIs within a field of view (FOV) of the first camera;
obtaining an image captured by the second camera;
obtaining second camera ROI information representative of a second number of ROIs within a FOV of the second camera and comprising, for each ROI of the second number of ROIs, ROI location information indicating a location of the ROI within the image captured by the second camera;
processing the first camera ROI information to determine the first number of ROIs;
processing the second camera ROI information to determine the second number of ROIs; and
in response to determining that the first number of ROIs is zero and the second number of ROIs is greater than zero:
updating the AE primary camera information to identify the second camera as the AE primary camera; and
processing portions of the image captured by the second camera at the locations of the ROIs indicated by the ROI location information to generate the AE settings of the first camera and the AE settings of the second camera.

2. The device of claim 1, wherein:
the second camera ROI information further comprises ROI weight information indicating one or more weights to be applied to one or more pixel locations within one or more of the second number of ROIs; and processing portions of the image at the locations of the ROIs indicated by the ROI location information comprises:
applying the ROI weight information to the portions of the image to generate the AE settings.

3. The device claim 1, wherein:
the AE settings comprise an exposure time setting and a camera gain setting.

4. The device of claim 1, wherein:
the operations further comprise:
obtaining default camera information identifying the first camera as a default primary camera;
obtaining further first camera ROI information and further second camera ROI information;
processing the further first camera ROI information and further second camera ROI information to determine an updated first number of ROIs within the FOV of the first camera and an updated second number of ROIs within the FOV of the second camera; and
in response to determining that the updated first number of ROIs is zero, the updated second number of ROIs is zero, and the first camera is the default primary camera:
updating the AE primary camera information to identify the first camera as the AE primary camera.

5. The device of claim 4, wherein:
the default primary camera is a hardware sync camera used for calibrating hardware.

6. The device of claim 1, wherein updating the AE primary camera information to identify the second camera as the AE primary camera in response to determining that the first number of ROIs is zero and the second number of ROIs is greater than zero comprises:
selecting the AE primary camera according to an AE primary camera selection scheme in which:
if the first number of ROIs is zero and the second number of ROIs is greater than zero, the second camera is selected as the AE primary camera;
if the second number of ROIs is zero and the first number of ROIs is greater than zero, the first camera is selected as the AE primary camera;
if the second number of ROIs is greater than zero and the first number of ROIs is greater than zero, the AE primary camera remains unchanged; and
if the second number of ROIs is zero and the first number of ROIs is zero, a default primary camera is selected as the AE primary camera.

7. The device of claim 6, wherein the operations further comprise:
obtaining default camera information identifying the first camera or the second camera as the default primary camera.

8. The device of claim 1, wherein the operations further comprise:
generating, by each client of one or more clients, client ROI information representative of one or more client ROIs, each client ROI being within the FOV of the first camera or the FOV of the second camera; and
processing the client ROI information of the one or more clients to generate the first camera ROI information and the second camera ROI information.

9. The device of claim 8, wherein:
the one or more clients include a hand tracking client;
the one or more client ROIs of the hand tracking client include at least one client ROI comprising hand location information representative of a location of a hand in the image; and processing the second camera ROI information to generate the AE settings comprises:

processing portions of the image at the location of the hand to generate AE settings configured to avoid underexposure or overexposure of the hand in further images captured by the second camera.

10. The device of claim 8, wherein:

the one or more clients include a keypoint tracking client;

the one or more client ROIs of the keypoint tracking client include at least one client ROI comprising keypoint location information representative of a location of a keypoint in the image; and processing the second camera ROI information to generate the AE settings comprises:

processing portions of the image captured by the second camera at the location of the keypoint to generate AE settings configured to avoid underexposure or overexposure of the keypoint in further images captured by the second camera.

11. A method, performed by a processor, comprising:

obtaining autoexposure (AE) primary camera information identifying a first camera as an AE primary camera to be used for computing AE settings of the first camera and a second camera;

obtaining first camera region of interest (ROI) information representative of a first number of ROIs within a field of view (FOV) of the first camera;

obtaining an image captured by the second camera;

obtaining second camera ROI information representative of a second number of ROIs within a FOV of the second camera and comprising, for each ROI of the second number of ROIs, ROI location information indicating a location of the ROI within the image captured by the second camera;

processing the first camera ROI information to determine the first number of ROIs;

processing the second camera ROI information to determine the second number of ROIs; and in response to determining that the first number of ROIs is zero and the second number of ROIs is greater than zero:

updating the AE primary camera information to identify the second camera as the AE primary camera; and processing portions of the image captured by the second camera at the locations of the ROIs indicated by the ROI location information to generate the AE settings of the first camera and the AE settings of the second camera.

12. The method of claim 11:

wherein:

the second camera ROI information further comprises ROI weight information indicating one or more weights to be applied to one or more pixel locations within one or more of the second number of ROIs; and processing portions of the image at the locations of the ROIs indicated by the ROI location information comprises:

applying the ROI weight information to the portions of the image to generate the AE settings.

13. The method of claim 11, wherein:

the AE settings comprise an exposure time setting and a camera gain setting.

14. The method of claim 11, further comprising:

obtaining default camera information identifying the first camera as a default primary camera;

obtaining further first camera ROI information and further second camera ROI information;

processing the further first camera ROI information and further second camera ROI information to determine an updated first number of ROIs within the FOV of the first camera and an updated second number of ROIs within the FOV of the second camera; and in response to determining that the updated first number of ROIs is zero, the updated second number of ROIs is zero, and the first camera is the default primary camera:

updating the AE primary camera information to identify the first camera as the AE primary camera.

15. The method of claim 14, wherein:

the default primary camera is a hardware sync camera used for calibrating hardware.

16. The method of claim 11, further comprising:

generating, by each client of one or more clients, client ROI information representative of one or more client ROIs, each client ROI being within the FOV of the first camera or the FOV of the second camera; and processing the client ROI information of the one or more clients to generate the first camera ROI information and the second camera ROI information.

17. The method of claim 16, wherein:

the one or more clients include a hand tracking client;

the one or more client ROIs of the hand tracking client include at least one client ROI comprising hand location information representative of a location of a hand in the image; and processing the second camera ROI information to generate the AE settings comprises:

processing portions of the image at the location of the hand to generate AE settings configured to avoid underexposure or overexposure of the hand in further images captured by the second camera.

18. The method of claim 16, wherein:

the one or more clients include a keypoint tracking client;

the one or more client ROIs of the keypoint tracking client include at least one client ROI comprising keypoint location information representative of a location of a keypoint in the image; and processing the second camera ROI information to generate the AE settings comprises:

processing portions of the image at the location of the keypoint to generate AE settings configured to avoid underexposure or overexposure of the keypoint in further images captured by the second camera.

19. A non-transitory computer-readable storage medium, the computer-readable storage medium including instructions that when executed by a processor of a system, cause the system to:

obtain autoexposure (AE) primary camera information identifying a first camera as an AE primary camera to be used for computing AE settings of the first camera and a second camera;

obtain first camera region of interest (ROI) information representative of a first number of ROIs within a field of view (FOV) of the first camera;

obtain an image captured by the second camera;

obtain second camera ROI information representative of a second number of ROIs within a FOV of the second camera and comprising, for each ROI of the second number of ROIs, ROI location information indicating a location of the ROI within the image captured by the second camera;

process the first camera ROI information to determine the first number of ROIs;

process the second camera ROI information to determine the second number of ROIs; and in response to determining that the first number of ROIs is zero and the second number of ROIs is greater than zero:

update the AE primary camera information to identify the second camera as the AE primary camera; and process portions of the image captured by the second camera at the locations of the ROIs indicated by the ROI location information to generate the AE settings of the first camera and the AE settings of the second camera.

\* \* \* \* \*